United States Patent
Motoki et al.

(10) Patent No.: US 8,982,533 B2
(45) Date of Patent: *Mar. 17, 2015

(54) MONOLITHIC ELECTRONIC COMPONENT AND METHOD FOR MANUFACTURING MONOLITHIC ELECTRONIC COMPONENT

(71) Applicant: Murata Manufacturing Co., Ltd., Nagaokakyo-shi, Kyoto-Fu (JP)

(72) Inventors: Akihiro Motoki, Fukui (JP); Akihiro Yoshida, Echizen (JP); Makoto Ogawa, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,309

(22) Filed: May 3, 2013

(65) Prior Publication Data

US 2013/0242458 A1 Sep. 19, 2013

Related U.S. Application Data

(63) Continuation of application No. 12/546,779, filed on Aug. 25, 2009, now Pat. No. 8,456,796.

(30) Foreign Application Priority Data

Oct. 9, 2008 (JP) .................................. 2008-262732

(51) Int. Cl.
*H01G 4/00* (2006.01)
*H01G 4/30* (2006.01)
(Continued)

(52) U.S. Cl.
CPC ................ *H01G 4/30* (2013.01); *C23C 18/405* (2013.01); *C23C 28/023* (2013.01); *C25D 5/10* (2013.01); *C25D 5/12* (2013.01); *H01G 4/2325* (2013.01); *C23C 28/028* (2013.01); *C25D 17/20* (2013.01)
USPC ..................... 361/306.1; 361/303; 361/308.1; 361/309; 361/311; 361/321.2

(58) Field of Classification Search
USPC ............. 361/306.1, 306.3, 308.1, 309, 321.2, 361/321.3, 300, 303, 311
See application file for complete search history.

(56) References Cited

U.S. PATENT DOCUMENTS 5,712,758 A * 1/1998 Amano et al. ............. 361/321.2
6,381,117 B1 * 4/2002 Nakagawa et al. ........ 361/306.3
(Continued)

FOREIGN PATENT DOCUMENTS

JP 2004055679 * 2/2004

OTHER PUBLICATIONS

Motoki et al., "Monolithic Electronic Component and Method for Manufacturing Monolithic Electronic Component", U.S. Appl. No. 12/546,779, filed Aug. 25, 2009.

*Primary Examiner* — Cathy Lam
(74) *Attorney, Agent, or Firm* — Keating & Bennett, LLP (57) ABSTRACT

A monolithic electronic component includes a laminate including a plurality of stacked insulating layers and a plurality of internal electrodes which extend between the insulating layers and which have end portions exposed at predetermined surfaces of the laminate, first plating layers disposed on the predetermined surfaces of the laminate, and second plating layers disposed on the first plating layer. The first plating layers are made of a metal different from that used to make the internal electrodes. The first plating layers are formed by electroless plating. The second plating layers are formed by electroplating.

4 Claims, 4 Drawing Sheets

(51) Int. Cl.
  *C23C 18/40* (2006.01)
  *C23C 28/02* (2006.01)
  *C25D 5/10* (2006.01)
  *C25D 5/12* (2006.01)
  *H01G 4/232* (2006.01)
  *C25D 17/20* (2006.01)

(56) References Cited

U.S. PATENT DOCUMENTS

| | | |
|---|---|---|
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 7,764,484 B2 * | 7/2010 | Motoki et al. ............. 361/306.1 |
| 8,254,081 B2 * | 8/2012 | Nishihara et al. ............. 361/300 |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

* cited by examiner

MONOLITHIC ELECTRONIC COMPONENT AND METHOD FOR MANUFACTURING MONOLITHIC ELECTRONIC COMPONENT

BACKGROUND OF THE INVENTION

1. Field of the Invention

The present invention relates to monolithic electronic components and methods for manufacturing the monolithic electronic components. The present invention particularly relates to a monolithic electronic component including a laminate and external electrodes formed on the laminate by plating and a method for manufacturing the monolithic electronic component.

2. Description of the Related Art

Figure 3:
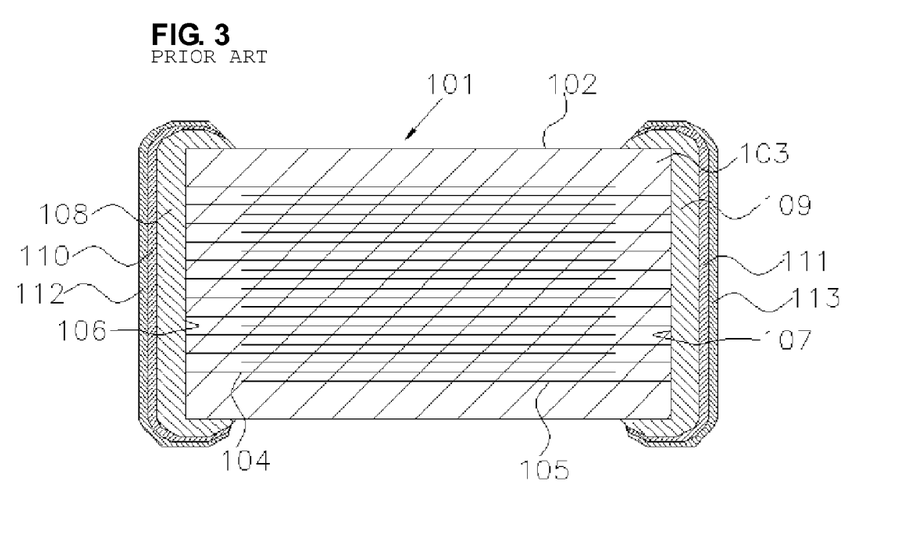
FIG. 3 is a sectional view of a conventional monolithic electronic component.

As shown in FIG. 3, a monolithic electronic component 101, such as a monolithic capacitor, usually includes a laminate 102 including a plurality of stacked insulating layers 103 and a plurality of laminar internal electrodes 104 and 105 extending between the insulating layers 103. The internal electrodes 104 and 105 have end portions exposed at end surfaces 106 and 107 of the laminate 102. External electrodes are disposed on the end surfaces 106 and 107 of the laminate 102 such that the exposed end portions of the internal electrodes 104 are electrically connected to each other and the exposed end portions of the internal electrodes 105 are electrically connected to each other.

The external electrodes are usually formed as described below. A metal paste including a metal component and a glass component is applied to the end surfaces 106 and 107 of the laminate 102 and then baked, whereby paste electrode layers 108 and 109 are formed. First plating layers 110 and 111 made of, for example, nickel are formed on the paste electrode layers 108 and 109, respectively. Second plating layers 112 and 113 made of, for example, tin are formed on the first plating layers 110 and 111, respectively. Therefore, the external electrodes each have a three-layer structure including the paste electrode layers 108 and 109, the first plating layers 110 and 111, and the second plating layers 112 and 113.

Since the monolithic electronic component 101 is soldered onto a circuit board, the external electrodes need to have good solder wettability. Furthermore, the external electrodes need to electrically connect the internal electrodes 104 and 105, which are electrically insulated from each other, to each other. The second plating layers 112 and 113 have wettability to solder. The paste electrode layers 108 and 109 electrically connect the internal electrodes 104 and 105 to each other. The first plating layers 110 and 111 prevent solder erosion during soldering.

The paste electrode layers 108 and 109 have a thickness of several tens to several hundreds of micrometers. In order to limit the dimensions of the monolithic electronic component 101 to predetermined standard values, the effective volume necessary to ensure the capacitance undesirably must be reduced because the paste electrode layers 108 and 109 occupy a large volume. On the other hand, the second plating layers 112 and 113 have a thickness of several micrometers. Therefore, if the external electrodes include the second plating layers 112 and 113 only, the effective volume necessary to ensure the capacitance can be increased.

For example, Japanese Unexamined Patent Application Publication No. 63-169014 discloses a process in which conductive metal layers are formed over a corresponding one of side surfaces of a laminate by electroless plating such that internal electrodes exposed at the side surfaces thereof are short-circuited.

In the monolithic electronic component disclosed in Japanese Unexamined Patent Application Publication No. 63-169014, a laminate includes internal electrodes which are made of nickel and which are exposed at surfaces of this laminate. The surfaces thereof may be plated with various metals and may be directly plated with, for example, copper, which has good growing power.

The process disclosed in Japanese Unexamined Patent Application Publication No. 63-169014 has a problem in that some of the junctions between the internal electrodes, which are made of nickel, and copper plating layers, are broken by heat shock due to reflow soldering, and therefore, a reduction in capacitance is caused.

SUMMARY OF THE INVENTION

To overcome the problems described above, preferred embodiments of the present invention provide a monolithic electronic component capable of solving the above problems. In addition, preferred embodiments of the present invention provide a method for manufacturing the monolithic electronic component.

According to a preferred embodiment of the present invention, a monolithic electronic component includes a laminate including a plurality of stacked insulating layers and a plurality of internal electrodes which extend between the insulating layers and which have end portions exposed at predetermined surfaces of the laminate, first plating layers disposed on the predetermined surfaces of the laminate, and second plating layers disposed on the first plating layers. The first plating layers are preferably made of a metal that is different from that used to make the internal electrodes. The first plating layers are preferably formed by electroless plating, for example. The second plating layers are preferably formed by electroplating, for example.

In the monolithic electronic component, the internal electrodes are preferably made of nickel, for example, the first plating layers are preferably made of copper, and the second plating layers are preferably made of copper. The monolithic electronic component preferably further includes third plating layers made of nickel and additional plating layers made of tin, the third plating layers being disposed on the second plating layers, the additional plating layers being disposed on the third plating layers.

A preferred embodiment of the present invention provides a method for manufacturing a monolithic electronic component.

The method includes a step of preparing a laminate including a plurality of stacked insulating layers and a plurality of internal electrodes which extend between the insulating layers and which have end portions exposed at predetermined surfaces of the laminate, a step of forming first plating layers electrically connecting the exposed end portions of the internal electrodes to each other such that the exposed end portions of the internal electrodes are plated with plating deposits made of a specific metal and the plating deposits are grown to be connected to each other so as to form uniform layers, and a step of forming second plating layers on the first plating layers. The first plating layers are preferably made of a metal that is different from that used to form the internal electrodes. The first plating layers are preferably formed by electroless plating, for example. The second plating layers are preferably formed by electroplating, for example.

In the method, the internal electrodes are preferably made of nickel, for example, the first plating layers are preferably made of copper, for example, and the second plating layers are preferably made of copper, for example. The method preferably further includes a step of forming third plating layers on the second plating layers using nickel, for example, and a step of forming additional plating layers on the third plating layers using tin, for example.

In a monolithic electronic component according to a preferred embodiment of the present invention or a method for manufacturing a monolithic electronic component according to a preferred embodiment of the present invention, internal electrodes are preferably made of a metal different from that used to make the first plating layers and have portions exposed at surfaces of a laminate, the first plating layers are disposed on the surfaces of the laminate and are preferably formed by electroless plating, and second plating layers disposed on the first plating layers are preferably formed by electroplating. Thus, a component of the first plating layers adequately diffuses into the internal electrodes when the first plating layers are subjected to heat shock at about 240° C. or higher. Therefore, electrical connections between the internal electrodes and the first plating layers are strong and are prevented from being broken by heat shock.

Even if exposed end portions of the internal electrodes are not subjected to a special treatment such as a treatment for increasing the degree of exposure in advance of forming the first plating layers, the electrical connections therebetween can be prevented from being broken by heat shock.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

A monolithic electronic component 1 according to a first preferred embodiment of the present invention will now be described with reference to FIG. 1.

Figure 1:
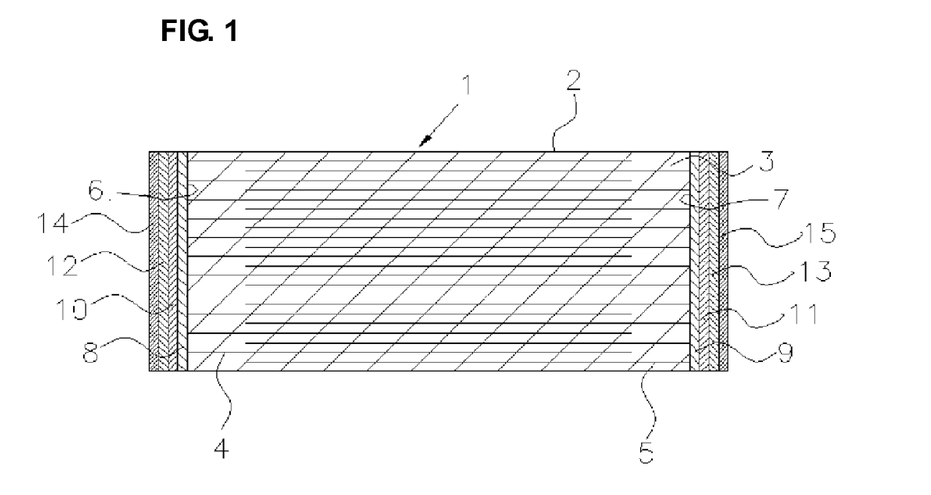
FIG. 1 is a sectional view of a monolithic electronic component according to a first preferred embodiment of the present invention.

FIG. 1 shows the monolithic electronic component 1 in cross section. The monolithic electronic component 1 includes a laminate 2 including a plurality of stacked insulating layers 3 and a plurality of laminar internal electrodes 4 and 5 extending between the insulating layers 3. When the monolithic electronic component 1 is a monolithic ceramic capacitor, the insulating layers 3 are preferably made of a dielectric material, for example. The internal electrodes 4 have end portions exposed at an end surface 6 of the laminate 2 and the internal electrodes 5 have end portions exposed at another end surface 7 thereof. The exposed end portions of the internal electrodes 4 and 5 are electrically connected to each other with a plurality of external electrodes.

The external electrodes include first plating layers 8 and 9 and second plating layers 10 and 11 disposed thereon.

The first plating layers 8 and 9 and the second plating layers 10 and 11 exclude plating layers, such as tin plating layers, solder plating layers, and gold plating layers, for example, that ensure solder wettability. This is because these plating layers are not significantly involved in a diffusion phenomenon caused by heat shock in the internal electrodes 4 and 5. If a nickel plating layer and a tin plating layer are formed on each of the end surfaces 6 and 7 of the laminate 2 in that order, then according to a preferred embodiment of the present invention, preferably, the first plating layers 8 and 9 are nickel plating layers and none of the second plating layers 10 and 11 is formed.

With reference to FIG. 1, a metal used to form the internal electrodes 4 and 5 is not particularly limited and is preferably nickel, for example.

The first plating layers 8 and 9 are preferably made of a metal that is different from that used to form the internal electrodes 4 and 5. When the internal electrodes 4 and 5 are made of nickel, the first plating layers 8 and 9 are preferably made of copper, for example. This combination is likely to cause diffusion between the first plating layers 8 and 9 and the internal electrodes 4 and 5 during heat shock.

The first plating layers 8 and 9 are preferably formed by electroless plating and the second plating layers 10 and 11 are preferably formed by electroplating. Since the first plating layers 8 and 9 are preferably formed by electroless plating, the diffusion from the first plating layers 8 and 9 to the internal electrodes 4 and 5 readily occurs even if the temperature of heat shock is as low as the temperature of reflow. The second plating layers 10 and 11, which are preferably formed by electroplating, prevent excessive diffusion from the first plating layers 8 and 9 to the internal electrodes 4 and 5 during heat shock. Since the first plating layers 8 and 9 are preferably formed by electroless plating and the second plating layers 10 and 11 are preferably formed by electroplating, a diffusion phenomenon due to heat shock during reflow is promoted and is adequately controlled. Thus, the electrical coupling between the internal electrodes 4 and 5 and the first plating layers 8 and 9 is improved. The second plating layers 10 and 11 preferably have a thickness of at least about 3 μm, for example, and more preferably at least about 4 μm, for example.

The first plating layers 8 and 9 and the second plating layers 10 and 11 are preferably made of substantially the same metal in view of advantages obtained by forming the first plating layers 8 and 9 and the second plating layers 10 and 11 by electroless plating and electroplating, respectively.

In the monolithic electronic component 1, for example, the internal electrodes 4 and 5 are preferably made of nickel, the first plating layers 8 and 9 are preferably formed by electroless plating using copper, and the second plating layers 10 and 11 are preferably formed by electroplating using copper. Furthermore, third plating layers 12 and 13, preferably formed by electroplating using nickel to prevent solder erosion, are preferably disposed on the second plating layers 10 and 11, respectively. Additional plating layers 14 and 15, formed by electroplating using tin, for example, to ensure solder wettability are preferably disposed on the third plating layers 12 and 13, respectively. When the internal electrodes 4 and 5 are made of copper, the first plating layers 8 and 9 are preferably made of nickel, for example.

Second Preferred Embodiment

Figure 2:
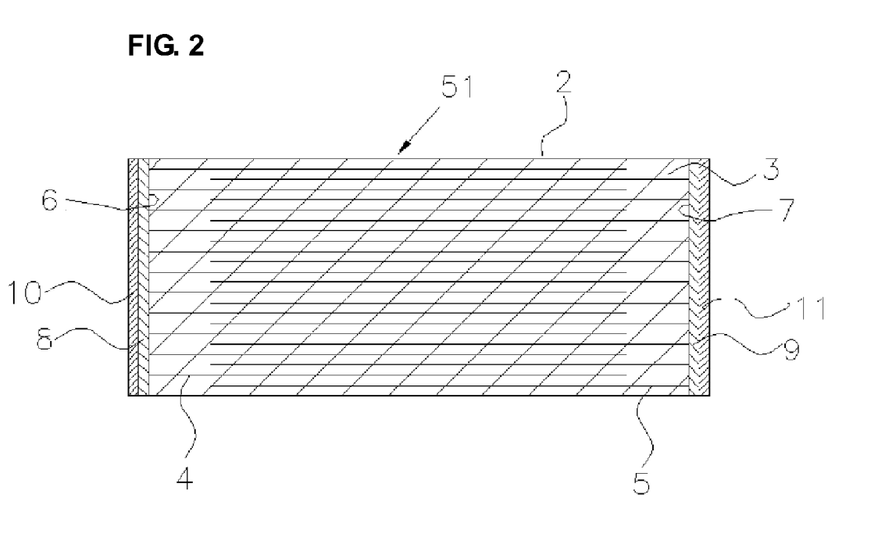
FIG. 2 is a sectional view of a monolithic electronic component according to a second preferred embodiment of the present invention.

FIG. 2 shows a monolithic electronic component 51 according to a second preferred embodiment of the present invention. The monolithic electronic component 51 is substantially the same as the monolithic electronic component 1 shown in FIG. 1, except that the monolithic electronic component 51 includes no third plating layers 12 and 13 to prevent solder erosion or additional plating layers 14 and 15 to ensure solder wettability. With reference to FIG. 2, the monolithic electronic component 51 includes first plating layers 8 and 9 and second plating layers 10 and 11. The first plating layers 8 and 9 are preferably formed by electroless plating using copper, for example, and the second plating layers 10 and 11 are preferably formed by electroplating using copper, for example. The monolithic electronic component 51 is used for solderless mounting.

Third Preferred Embodiment

A method for manufacturing a monolithic electronic component according to a third preferred embodiment the present invention will now be described.

A laminate 2 including a plurality of stacked insulating layers 3 and a plurality of internal electrodes 4 and 5 extending between the insulating layers 3 is provided. The internal electrodes 4 are exposed at an end surface 6 of the laminate 2 and the internal electrodes 5 are exposed at another end surface 7 thereof. No problems arise if the internal electrodes 4 and 5 are slightly recessed from the end surfaces 6 and 7 of the laminate 2. If the internal electrodes 4 and 5 need to be sufficiently exposed at the end surfaces 6 and 7 of the laminate 2, the insulating layers 3 may preferably be ground by sandblasting or barreling, for example, such that the internal electrodes 4 and 5 are sufficiently exposed at the end surfaces 6 and 7 of the laminate 2. The internal electrodes 4 and 5 preferably protrude at least about 0.1 µm, for example, from the end surfaces 6 and 7 of the laminate 2 because plating deposits are readily grown from the exposed end portions of the internal electrodes 4 and 5.

First plating layers 8 and 9 are each formed on a corresponding one of the end surfaces 6 and 7 of the laminate 2 such that the exposed end portions of the internal electrodes 4 are electrically connected to each other and those of the internal electrodes 5 are electrically connected to each other.

In the step of forming the first plating layers 8 and 9, the exposed end portions of the internal electrodes 4 and 5 are plated with the plating deposits and the plating deposits are grown to be connected to each other, whereby the first plating layers 8 and 9 are uniformly formed on the end surfaces 6 and 7 of the laminate 2.

When such a plating process as described above is used, no catalyst to enhance the action of a reducing agent for electroless plating may be used, that is, no palladium may be provided on the end surface 6 or 7 of the laminate 2. In this case, there is no problem if a metal used to form the internal electrodes 4 and 5 has catalytic activity against the reducing agent. Even if the metal used to form the internal electrodes 4 and 5 has no catalytic activity against the reducing agent, the exposed end portions of the internal electrodes 4 and 5 can be catalytically activated such that metal pieces with catalytic activity are used in a stirring medium for barrel plating.

The plating process used to form the first plating layers 8 and 9 uses the growth power and high malleability of the plating deposits. Therefore, the distance between the adjacent internal electrodes 4 or 5 is preferably about 50 µm or less and more preferably about 20 µm or less because the plating deposits are readily connected to each other at such distances.

After the first plating layers 8 and 9 are formed by electroless plating as described above, second plating layers 10 and 11 are preferably formed on the first plating layers 8 and 9, respectively, by a common electroplating process, such as a barrel electroplating process, for example.

The present invention has been described with reference to the preferred embodiments described. The present invention can be variously modified within the scope of the present invention.

Examples of a monolithic electronic component according to a preferred embodiment of the present invention include monolithic chip capacitors, monolithic chip inductors, and monolithic chip thermistors.

Insulating layers included in a monolithic electronic component according to a preferred embodiment of the present invention are only required to have electrically insulating properties and the materials used therefore are not particularly.

The insulating layers are not limited to those made of a dielectric insulating material and may preferably be those made of a piezoelectric insulating material, a semiconductor insulating material, or a magnetic insulating material, for example.

Figure 4:
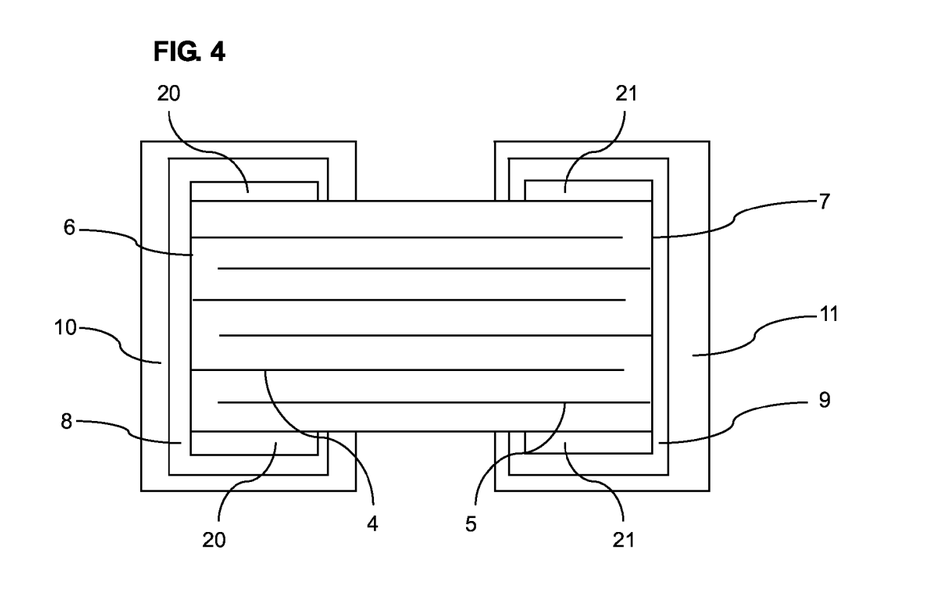
FIG. 4 is a sectional view of a monolithic electronic component according to another preferred embodiment of the present invention.

External electrodes included in a monolithic electronic component according to a preferred embodiment of the present invention substantially include plating layers only and may preferably further include paste electrodes located at positions not involved in connecting a plurality of internal electrodes. As shown in FIG. 4, if the external electrodes need to extend to surfaces next to end surfaces 6 and 7 at which the internal electrodes 4 and 5 are exposed, thick paste electrodes 20 and 21 may preferably be provided. This facilitates soldering and effectively prevents the permeation of moisture through the end portions of the plating layers 8 and 9.

The monolithic electronic component 1 shown in FIG. 1 includes no protective layers and may preferably include protective layers disposed on both sides of the laminate 2 thereof so as to improve reliability. In this case, plating layers can preferably be formed on surface portions of the protective layers such that dummy electrodes are exposed at the surface portions thereof. This applies not only to the protective layers but also applies to portions of the external electrodes that that are folded on side surfaces of the laminate 2.

The external electrodes shown in FIG. 1 preferably are, for example, a two-terminal type. The monolithic electronic component 1 shown in FIG. 1 may include a greater number of external electrodes such as array-type external electrodes including pairs of sub-electrodes.

Experiments performed to determine the scope of preferred embodiments of the present invention or to confirm advantages of preferred embodiments of the present invention will now be described.

EXAMPLE 1

Laminates to be used in monolithic electronic components, such as monolithic ceramic capacitors, were prepared. The laminates had a length of about 3.1 mm, a width of about 1.55 mm, and a height of about 1.55 mm. The laminates each included insulating layers made of a barium titanate dielectric material and internal electrodes made of nickel. The internal electrodes had a thickness of about 1 µm and the insulating layers had a thickness of about 2.0 µm. The internal electrodes had end portions exposed at end surfaces of the laminates. The distance between the adjacent exposed end portions of the internal electrodes was about 4.0 µm.

About 200 of the laminates were disposed in a horizontal rotary barrel with a volume of about 300 mL. In addition, about 100 mL of copper media with a diameter of about 1.3 mm were disposed in the horizontal rotary barrel.

First plating layers, made of copper, having a thickness of about 2 µm were formed on the end surfaces of the laminates by electroless plating such that the horizontal rotary barrel was immersed in a copper electroless plating bath, aerated at a rate of about 0.5 L/min, with a temperature of about 40° C. and then rotated at a peripheral speed of about 2.6 m/min. The copper electroless plating bath contained the following components:
about 0.04 mol/L of copper sulfate tetrahydrate,
about 0.16 mol/L of formaldehyde,
about 0.1 mol/L of sodium potassium tartrate tetrahydrate,
about 1.0 g/L of polyethylene glycol, and
about 0.125 mol/L of sodium hydroxide.

The horizontal rotary barrel was immersed in a copper electroplating bath, PYROBRITE SYSTEM, available from C. Uyemura & Co., Ltd. The copper electroplating bath had a temperature of about 55° C. and a pH of about 8.6. Second plating layers, made of copper, having a thickness of about 4 µm were formed on the first plating layers by electroplating such that the horizontal rotary barrel was rotated at a peripheral speed of about 2.6 m/min and the copper electroplating bath was operated at a current density of about 1.0 A/dm$^2$.

The horizontal rotary barrel was immersed in a common Watts bath with a temperature of about 55° C. and a pH of about 4.0. Third plating layers, made of nickel, having a thickness of about 2 µm were formed on the second plating layers by electroplating such that the horizontal rotary barrel was rotated at a peripheral speed of about 2.6 m/min and the Watts bath was operated at a current density of about 0.5 A/dm$^2$.

The horizontal rotary barrel was immersed in a tin electroplating bath, Sn-235, available from Dipsol Chemicals Co., Ltd. The tin electroplating bath had a temperature of about 33° C. and a pH of about 5.0. In order to ensure solder wettability, additional plating layers, made of tin, having a thickness of about 4 µm were formed on the third plating layers by electroplating such that the horizontal rotary barrel was rotated at a peripheral speed of about 2.6 m/min and the tin electroplating bath was operated at a current density of about 0.3 A/dm$^2$. The laminates were removed from the horizontal rotary barrel and then dried at about 60° C. for about ten minutes, whereby monolithic electronic components were obtained.

After the monolithic electronic components were subjected to heat shock at about 245° C. for about ten seconds, connections between the first, second, third, and additional plating layers and the internal electrodes were tested as described below. After the monolithic electronic components were maintained at about 150° C. for about 60 minutes and then left at room temperature for about 22 hours, the monolithic electronic components were measured for capacitance. The resulting monolithic electronic components were subjected to the following cycle five times: a cycle in which the monolithic electronic components were each applied with a voltage of about 40 V for about five seconds and then short-circuited. After the resulting monolithic electronic components were maintained at about 150° C. for about 60 minutes and then left at room temperature for about hours, the capacitances of the monolithic electronic components were measured. About 100 of the monolithic electronic components were evaluated such that the tested monolithic electronic components having a capacitance at least about 1% different from the initial capacitance thereof were determined to be defective. As a result, none of the evaluated monolithic electronic components was determined to be defective.

EXAMPLE 2

Substantially the same laminates as those described in Example 1 were prepared.

About 200 of the laminates were disposed in a horizontal rotary barrel with a volume of about 300 mL. In addition, about 100 mL of copper media with a diameter of about 1.3 mm were disposed in the horizontal rotary barrel.

First plating layers, made of copper, having a thickness of about 2 µm were formed on end surfaces of the laminates by electroless plating such that the horizontal rotary barrel was immersed in a copper electroless plating bath with a temperature of about 40° C. and then rotated at a peripheral speed of about 2.6 m/min. The copper electroless plating bath was substantially the same as that described in Example 1.

The horizontal rotary barrel was immersed in a common Watts bath with a temperature of about 55° C. and a pH of about 4.0. Second plating layers, made of nickel, having a thickness of about 4 µm were formed on the first plating layers by electroplating such that the horizontal rotary barrel was rotated at a peripheral speed of about 2.6 m/min and the Watts bath was operated at a current density of about 0.5 A/dm$^2$.

The horizontal rotary barrel was immersed in a tin electroplating bath, Sn-235, available from Dipsol Chemicals Co., Ltd. The tin electroplating bath had a temperature of about 33° C. and a pH of about 5.0. In order to ensure solder wettability, additional plating layers, made of tin, having a thickness of about 4 µm were formed on the second plating layers by electroplating such that the horizontal rotary barrel was rotated at a peripheral speed of about 2.6 m/min and the tin electroplating bath was operated at a current density of about 0.3 A/dm$^2$. The laminates were removed from the horizontal rotary barrel and then dried at about 60° C. for about ten minutes, whereby monolithic electronic components were obtained.

After the monolithic electronic components were subjected to heat shock at about 245° C. for about ten seconds, connections between the first, second, and additional plating layers and the internal electrodes were tested in substantially the same manner as that described in Example 1. About 100 of the tested monolithic electronic components were evaluated. As a result, one of the evaluated monolithic electronic components was determined to be defective.

EXAMPLE 3

Substantially the same laminates as those described in Example 1 were prepared.

About 200 of the laminates were disposed in a horizontal rotary barrel with a volume of about 300 mL. In addition, about 100 mL of copper media with a diameter of about 1.3 mm were disposed in the horizontal rotary barrel.

First plating layers, made of copper, having a thickness of about 1 µm were formed on end surfaces of the laminates by electroless plating such that the horizontal rotary barrel was immersed in a copper electroless plating bath with a temperature of about 40° C. and then rotated at a peripheral speed of about 2.6 m/min. The copper electroless plating bath was substantially the same as that described in Example 1.

The horizontal rotary barrel was immersed in a copper electroplating bath, PYROBRITE SYSTEM, available from C. Uyemura & Co., Ltd. The copper electroplating bath had a temperature of about 55° C. and a pH of about 8.6. Second plating layers, made of copper, having a thickness of about 5 µm were formed on the first plating layers by electroplating such that the horizontal rotary barrel was rotated at a peripheral speed of about 2.6 m/min and the copper electroplating bath was operated at a current density of about 1.0 A/dm$^2$. The laminates were removed from the horizontal rotary barrel and then dried at about 60° C. for about ten minutes, whereby monolithic electronic components were obtained.

After the monolithic electronic components were subjected to heat shock at about 245° C. for about ten seconds, connections between the first and second plating layers and the internal electrodes were tested in substantially the same manner as that described in Example 1. About 100 of the tested monolithic electronic components were evaluated. As a result, none of the evaluated monolithic electronic components was determined to be defective.

COMPARATIVE EXAMPLE 1

Substantially the same laminates as those described in Example 1 were prepared.

About 200 of the laminates were disposed in a horizontal rotary barrel with a volume of about 300 mL. In addition, about 100 mL of copper media with a diameter of about 1.3 mm were disposed in the horizontal rotary barrel.

First plating layers, made of copper, having a thickness of about 6 μm were formed on end surfaces of the laminates by electroplating such that the horizontal rotary barrel was immersed in a copper electroplating bath with a temperature of about 55° C. and a pH of about 8.6 and then rotated at a peripheral speed of about 2.6 m/min and the copper electroless plating bath was operated at a current density of about 1.0 A/dm$^2$. The copper electroplating bath was substantially the same as that described in Example 1.

The horizontal rotary barrel was immersed in a common Watts bath with a temperature of about 55° C. and a pH of about 4.0. Second plating layers, made of nickel, having a thickness of about 2 μm were formed on the first plating layers by electroplating such that the horizontal rotary barrel was rotated at a peripheral speed of about 2.6 m/min and the Watts bath was operated at a current density of about 0.5 A/dm$^2$.

The horizontal rotary barrel was immersed in a tin electroplating bath, Sn-235, available from Dipsol Chemicals Co., Ltd. The tin electroplating bath had a temperature of about 33° C. and a pH of about 5.0. In order to ensure solder wettability, additional plating layers, made of tin, having a thickness of about 4 μm were formed on the second plating layers by electroplating such the horizontal rotary barrel was rotated at a peripheral speed of about 2.6 m/min and the tin electroplating bath was operated at a current density of about 0.3 A/dm$^2$. The laminates were removed from the horizontal rotary barrel and then dried at about 60° C. for about ten minutes, whereby monolithic electronic components were obtained.

After the monolithic electronic components were subjected to heat shock at about 245° C. for about ten seconds, connections between the first, second, and additional plating layers and the internal electrodes were tested in substantially the same manner as that described in Example 1. About 100 of the tested monolithic electronic components were evaluated. As a result, about 28 of the evaluated monolithic electronic components were determined to be defective.

COMPARATIVE EXAMPLE 2

Substantially the same laminates as those described in Example 1 were prepared.

About 200 of the laminates were disposed in a horizontal rotary barrel with a volume of about 300 mL. In addition, about 100 mL of copper media with a diameter of about 1.3 mm were disposed in the horizontal rotary barrel.

First plating layers, made of copper, having a thickness of about 2 μm were formed on end surfaces of the laminates by electroless plating such that the horizontal rotary barrel was immersed in a copper electroless plating bath with a temperature of about 40° C. and then rotated at a peripheral speed of about 2.6 m/min. The copper electroless plating bath was substantially the same as that described in Example 1.

The copper media were removed from the horizontal rotary barrel and about 100 mL of nickel media with a diameter of about 1.3 mm were then disposed in the horizontal rotary barrel. Second plating layers, made of nickel, having a thickness of about 4 μm were formed on the first plating layers by electroless plating such that the horizontal rotary barrel was immersed in a nickel electroless plating bath with a temperature of about 65° C. and a pH of about 7.0 and then rotated at a peripheral speed of about 2.6 m/min. The nickel electroless plating bath contained the following components:
  about 0.1 mol/L of nickel (II) sulfate hexahydrate,
  about 0.2 mol/L of sodium hypophosphite monohydrate,
  about 0.3 mol/L of gluconolactone, and
  about 0.00001 mol/L of bismuth sulfate.

The horizontal rotary barrel was immersed in a tin electroplating bath, Sn-235, available from Dipsol Chemicals Co., Ltd. The tin electroplating bath had a temperature of about 33° C. and a pH of about 5.0. In order to ensure solder wettability, additional plating layers, made of tin, having a thickness of about 4 μm were formed on the second plating layers by electroplating such that the horizontal rotary barrel was rotated at a peripheral speed of about 2.6 m/min and the tin electroplating bath was operated at a current density of about 0.3 A/dm$^2$. The laminates were removed from the horizontal rotary barrel and then dried at about 60° C. for about ten minutes, whereby monolithic electronic components were obtained.

After the monolithic electronic components were subjected to heat shock at about 245° C. for about ten seconds, connections between the first, second, and additional plating layers and the internal electrodes were tested in substantially the same manner as that described in Example 1. About 100 of the tested monolithic electronic components were evaluated. As a result, about 40 of the evaluated monolithic electronic components were determined to be defective.

COMPARATIVE EXAMPLE 3

Substantially the same laminates as those described in Example 1 were prepared.

About 200 of the laminates were put into a horizontal rotary barrel with a volume of about 300 mL. In addition, about 100 mL of copper media with a diameter of about 1.3 mm were disposed in the horizontal rotary barrel.

The horizontal rotary barrel was immersed in a copper electroplating bath with a temperature of about 55° C. and a pH of about 8.6. First plating layers, made of copper, having a thickness of about 6 μm were formed on end surfaces of the laminates by electroplating such that the horizontal rotary barrel was rotated at a peripheral speed of about 2.6 m/min and the copper electroplating bath was operated at a current density of about 1.0 A/dm$^2$. The copper electroplating bath was substantially the same as that described in Example 1. The laminates were removed from the horizontal rotary barrel and then dried at about 60° C. for about ten minutes, whereby monolithic electronic components were obtained.

After the monolithic electronic components were subjected to heat shock at about 245° C. for about ten seconds, connections between the first plating layers and the internal electrodes were tested in substantially the same manner as that described in Example 1. About 100 of the tested monolithic electronic components were evaluated. As a result, about 15 of the evaluated monolithic electronic components were determined to be defective.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monolithic electronic component comprising:
   a laminate including a plurality of stacked insulating layers and a plurality of internal electrodes extending between the insulating layers and including end portions exposed at predetermined surfaces of the laminate;
   first plating layers disposed directly on the predetermined surfaces of the laminate and connected directly to the plurality of internal electrodes; and
   second plating layers disposed on the first plating layers; wherein
   the first plating layers are made of a metal different from that used to make the plurality of internal electrodes, the first plating layers are electroless plated layers that are made by an electroless plating process, and the second plating layers are electroplated layers that are made by an electroplating process; and
   a thickness of the second plating layer is greater than a thickness of the first plating layer.

2. The monolithic electronic component according to claim 1, wherein the plurality of internal electrodes are made of nickel and the first plating layers are made of copper.

3. The monolithic electronic component according to claim 2, wherein the second plating layers are made of copper.

4. The monolithic electronic component according to claim 3, further comprising third plating layers made of nickel and additional plating layers made of tin, the third plating layers being disposed on the second plating layers, the additional plating layers being disposed on the third plating layers.

* * * * *